United States Patent
Chen (10) Patent No.: US 11,540,269 B2
(45) Date of Patent: Dec. 27, 2022

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/627,753

(22) PCT Filed: Jul. 5, 2017

(86) PCT No.: PCT/CN2017/091861
§ 371 (c)(1),
(2) Date: Dec. 30, 2019

(87) PCT Pub. No.: WO2019/006702
PCT Pub. Date: Jan. 10, 2019

(65) Prior Publication Data
US 2020/0128523 A1    Apr. 23, 2020

(51) Int. Cl.
*H04W 72/04*    (2009.01)
*H04W 72/08*    (2009.01)
(Continued)

(52) U.S. Cl.
CPC ........ *H04W 72/044* (2013.01); *H04B 7/0626* (2013.01); *H04L 5/0007* (2013.01); *H04L 5/0048* (2013.01); *H04W 72/087* (2013.01)

(58) Field of Classification Search
None
See application file for complete search history.

(56) References Cited

U.S. PATENT DOCUMENTS

2012/0307772 A1* 12/2012 Kwon ............... H04L 5/0057
370/329
2013/0194908 A1*  8/2013 Gao ................. H04W 72/0406
370/203
(Continued)

FOREIGN PATENT DOCUMENTS

CN     102075274 A    5/2011
CN     102075274 B    5/2011
(Continued)

OTHER PUBLICATIONS www.ietdl.org; Published in IET Communications; revised Jun. 4, 2011; Sounding reference signal pattern design for time division duplex multiple input multiple output and orthogonal frequency division multiplexing systems; 9 pages.
(Continued)

*Primary Examiner* — Steve R Young
(74) *Attorney, Agent, or Firm* — Young Basile Hanlon & MacFarlane, P.C.

(57) ABSTRACT

Embodiments of the present application provide a wireless communication method and device. The method may include: a terminal device determines at least one time domain resource unit occupied by SRS transmission over an SRS resource; the terminal device determines a resource utilization mode used for transmitting the SRS on the at least one time domain resource unit; the terminal device performs, according to the determined resource utilization mode, the SRS transmission on the at least one time domain resource unit.

18 Claims, 4 Drawing Sheets

(51) Int. Cl.
*H04L 5/00* (2006.01)
*H04B 7/06* (2006.01)

(56) References Cited

U.S. PATENT DOCUMENTS

| 2017/0064558 | A1 | 3/2017 | Li | |
|---|---|---|---|---|
| 2017/0366311 | A1* | 12/2017 | Iyer | H04B 7/0482 |
| 2019/0097772 | A1* | 3/2019 | Yang | H04L 5/0051 |
| 2019/0246416 | A1* | 8/2019 | Park | H04W 72/1284 |

FOREIGN PATENT DOCUMENTS

| CN | 102083219 | A | 6/2011 |
|---|---|---|---|
| CN | 103299694 | A | 9/2013 |
| CN | 106254047 | A | 12/2016 |
| CN | 106685616 | A | 5/2017 |
| RU | 2407230 | C2 | 12/2010 |
| RU | 2510575 | C2 | 3/2014 |
| RU | 2619085 | C2 | 5/2017 |
| WO | 2008009027 | A2 | 1/2008 |
| WO | 2011135788 | A1 | 11/2011 |
| WO | 2013117231 | A1 | 8/2013 |
| WO | 2016036158 | A1 | 3/2016 |

OTHER PUBLICATIONS

3GPP TSG-RAM WG1#60bis; Beijing, China, Apr. 12-16, 2010; R1-101819.
3GPP TSG RAN WG1 Meeting#89; Hangzhou, P.R. China May 15-19, 2017; R1-1707601.
3GPP TSG RAN WG1 Meeting #89; Hangzhou, China 15th- 195h May 2017; R1-1707605.
3GPP TSG RAN WG1 Nr Ad-Hoc#2; Quingdao, China, Jun. 27-30, 2017; R1-1710688.
3GPP TSG RAN WG1 NR Ad Hoc Meeting; Qingdao, China, Jun. 27-30, 2017; R1-1709936.
European search report issued in corresponding European application No. 17916601.2 dated May 8, 2020.
3GPP TSG RAN WG1 Meeting #89; Hangzhou, P.R. China May 15-19, 2017; R1-1707490.
3GPP TSG RAN WGI Meeting #88bis; Spokane, USA Apr. 3-7, 2017; RI-1704241.
Extended European Search Report for EP Application 17916601.2 dated Sep. 16, 2020.
Russia Non-Final Rejection with English Translation for RU Application 2019141683 dated Sep. 7, 2020.
Chile Examination Report with English Translation for CL Application 2019003864 dated Apr. 23, 2021.
Japanese Office Action with English Translation for JP Application 2019-568726 dated May 21, 2021. (11 pages).
Indian Examination Report for IN Application 201917054309 dated May 4, 2021. (7 pages).
Chinese First Office Action with English Translation for CN Application 202010106061.1 dated May 8, 2021. (22 pages).
Canadian Examination Report for CA Application 3066919 dated Mar. 1, 2021. (4 pages).
Guangdong OPPO Mobile Telecom, On SRS design for NR, 3GPP TSG RAN WG1 Meeting #88, R1-1701946, Feb. 13-17, 2017. (3 pages).
Guangdong OPPO Mobile Telecom, Discussion on the UL Beam Management, 3GPP TSG RAN WG1 NR Ad-Hoc#2, R1-1710143, Jun. 27-30, 2017. (4 pages).
Chinese Second Office Action with English Translation for CN Application 202010106061.1 dated Aug. 11, 2021. (16 pages).
Communication pursuant to Article 94(3) EPC for EP Application 17916601.2 dated Jun. 10, 2021. (6 pages).
Singapore Invitation to Respond to Written Opinion for SG Application 11201912249V dated Jul. 14, 2021. (7 pages).
Chile Office Action with English Translation for CL Application 2019003864 dated Oct. 15, 2021. (14 pages).
Korean Office Action with English Translation for KR Application 1020197037251 dated Dec. 8, 2021. (8 pages).
3GPP TSG RAN WG1 NR Ad-Hoc Meeting, Spokane, USA, R1-1700118, ZTE, ZTE Microelectronics, Aspects of UL MIMO transmission, Jan. 16-20, 2017. (5 pages).
Korean Written Decision on Registration with English Translation for KR Application 1020197037251 dated Jun. 13, 2022. (3 pages).
Sony, Open issues on SRS design, 3GPP TSG RAN WG1 NR Ad-Hoc#2, R1-1711951, Jun. 27-30, 2017. (28 pages).
Communication pursuant to Article 94(3) EPC for EP Application 17916601.2 dated Apr. 20, 2022. (6 pages).
Canadian Examination Report for CA Application 3066919 dated Jan. 26, 2022. (3 pages).
Taiwan Office Action with English Translation for TW Application 107123243 dated Jan. 28, 2022. (20 pages).
Indonesia First Office Action with English Translation for ID Application P00202000664 dated Sep. 24, 2022. (7 pages).
Australian First Examination Report for AU Application 2017421898 dated Oct. 6, 2022. (4 pages).
Israel First Office Action for IL Application 271408 dated Jul. 21, 2022. (7 pages).

* cited by examiner

A terminal device determines at least one time domain resource unit to be occupied for performing SRS transmission on an SRS resource — 210

The terminal device determines a resource utilization scheme used for transmitting an SRS on the at least one time domain resource unit — 220

The terminal device performs the SRS transmission on the at least one time domain resource unit according to the determined resource utilization scheme — 230

WIRELESS COMMUNICATION METHOD AND DEVICE

CROSS-REFERENCE TO RELATED APPLICATION(S)

This application is a 371 application of International Application No. PCT/CN2017/091861, filed on Jul. 5, 2017, the entire disclosure of which is hereby incorporated by reference.

TECHNICAL FIELD

The present disclosure relates to the field of communications, and more particularly, to a wireless communication method and device.

BACKGROUND

In a wireless communication system, a terminal device may send a Sounding Reference Signal (SRS) through an SRS resource.

A network device may perform, for example, measurement for Channel State Information (CSI) and beam management based on an SRS sent by a terminal.

In a future wireless communication system, communication scenarios are various. How to realize reasonable SRS sending to improve communication performance is an urgent problem to be solved.

SUMMARY

Implementations of the present disclosure provide a wireless communication method and device, which can realize that a terminal device flexibly selects a resource utilization scheme used for transmitting an SRS on a time domain resource unit.

In a first aspect, a wireless communication method is provided, including: determining, by a terminal device, at least one time domain resource unit occupied for performing SRS transmission on an SRS resource; determining, by the terminal device, a resource utilization scheme used for transmitting an SRS on the at least one time domain resource unit; and performing, by the terminal device, the SRS transmission on the at least one time domain resource unit according to the determined resource utilization scheme.

In combination with the first aspect, in a possible implementation of the first aspect, the resource utilization scheme is a scheme by which the terminal device utilizes a frequency domain resource, a transmit antenna and/or a transmit beam in case of performing the SRS transmission on the at least one time domain resource unit.

In combination with the first aspect or any one of the above-mentioned possible implementations, in another possible implementation of the first aspect, the mode of utilizing the frequency domain resource, the antenna and/or the transmit beam includes a switching mode of at least one of the frequency domain resource, the sending antenna or the transmit beam in the at least one time domain resource unit.

In combination with the first aspect or any one of the above-mentioned possible implementations, in another possible implementation of the first aspect, the mode of utilizing the frequency domain resource, the antenna and/or the transmit beam indicates whether at least one of the frequency domain resource, the sending antenna or the transmit beam is switched on the at least one time domain resource unit.

In combination with the first aspect or any one of the above-mentioned possible implementations, in another possible implementation of the first aspect, the resource utilization scheme includes: performing resource hopping on frequency domain resources in the at least one time domain resource unit; or, switching a sending antenna in the at least one time domain resource unit; or, switching a transmit beam in the at least one time domain resource unit; or, adopting a same beam and a same frequency domain resource for transmission in the at least one time domain resource unit.

In combination with the first aspect or any one of the above-mentioned possible implementations, in another possible implementation of the first aspect, switching the sending antenna in the at least one time domain resource unit includes: switching the sending antenna within a same antenna panel in the at least one time domain resource unit; or performing switching between different antenna panels in the at least one time domain resource unit.

In combination with the first aspect or any one of the above-mentioned possible implementations, in another possible implementation of the first aspect, determining, by the terminal device, the resource utilization scheme used for transmitting the SRS in the at least one time domain resource unit, includes: determining, by the terminal device, the resource utilization scheme according to a parameter configuration of the SRS resource.

In combination with the first aspect or any one of the above-mentioned possible implementations, in another possible implementation of the first aspect, the parameter configuration of the SRS resource includes a configuration of the resource utilization scheme by the network device for transmitting the SRS on the at least one time domain resource unit; and determining, by the terminal device, the resource utilization scheme according to the parameter configuration of the SRS resource, includes: determining, by the terminal device, the resource utilization scheme according to the configuration of the resource utilization scheme by the network device for transmitting the SRS on the at least one time domain resource unit.

In combination with the first aspect or any one of the above-mentioned possible implementations, in another possible implementation of the first aspect, determining, by the terminal device, the resource utilization scheme according to the parameter configuration of the SRS resource, includes: determining, by the terminal device, the resource utilization scheme according to a configuration of at least one of the following: a transmission bandwidth of the SRS resource; a quantity of antenna ports for performing the SRS transmission on the SRS resource; a quantity of the at least one time domain resource unit occupied by the SRS resource; a persistent scheme of transmitting the SRS on the SRS resource; an SRS resource hopping configuration of the SRS resource; an interval of subcarriers occupied for transmitting the SRS on the SRS resource; an SRS type of the SRS resource.

In combination with the first aspect or any one of the above-mentioned possible implementations, in another possible implementation of the first aspect, the persistent scheme of transmitting the SRS on the SRS resource includes a periodic transmission scheme, a semi-persistent transmission scheme, or an aperiodic transmission scheme.

In combination with the first aspect or any one of the above-mentioned possible implementations, in another possible implementation of the first aspect, the SRS type of the SRS resource is: an SRS for Channel State Information (CSI) measurement; or an SRS for beam management.

In combination with the first aspect or any one of the above-mentioned possible implementations, in another possible implementation of the first aspect, in case that the quantity of antenna ports for performing the SRS transmission on the SRS resource is less than a first predetermined value, the determined resource utilization scheme is switching a sending antenna in the at least one time domain resource unit; or in case that the quantity of antenna ports for performing the SRS transmission on the SRS resource is greater than or equal to a second predetermined value, the determined resource utilization scheme is not switching a sending antenna in the at least one time domain resource unit.

In combination with the first aspect or any one of the above-mentioned possible implementations, in another possible implementation of the first aspect, in case that a value of the SRS resource hopping configuration of the SRS resource is a first value, the determined resource utilization scheme is performing resource hopping on frequency domain resources in the at least one time domain resource unit; or in case that a value of the SRS resource hopping configuration of the SRS resource is not the first value, the determined resource utilization scheme is: switching a sending antenna in the at least one time domain resource unit; or, switching a transmit beam in the at least one time domain resource unit; or, adopting a same beam and a same frequency domain resource for transmission in the at least one time domain resource unit.

In combination with the first aspect or any one of the above-mentioned possible implementations, in another possible implementation of the first aspect, after performing, by the terminal device, the SRS transmission on the at least one time domain resource unit, the method further includes: receiving, by the terminal device, a target time domain resource unit in the at least one time domain resource unit indicated by the network device.

In combination with the first aspect or any of the above-mentioned possible implementations, in another possible implementation of the first aspect, the time domain resource unit is a OFDM symbol, a time slot, a mini time slot or a subframe.

In a second aspect, a wireless communication method is provided, including:
  determining, by a network device, at least one time domain resource unit for performing Sounding Reference Signal (SRS) reception on an SRS resource; determining, by the network device, a resource utilization scheme used by the terminal device to transmit an SRS in the at least one time domain resource unit; receiving, by the network device, the SRS transmitted by the terminal device on the at least one time domain resource unit according to the determined resource utilization scheme.

In combination with the second aspect, in a possible implementation of the second aspect, the resource utilization scheme is a scheme by which the terminal device utilizes a frequency domain resource, a transmit antenna and/or a transmit beam in case of performing SRS transmission on the at least one time domain resource unit.

In combination with the second aspect or any one of the above-mentioned possible implementations, in another possible implementation of the second aspect, the mode of utilizing the frequency domain resource, the antenna and/or the transmit beam includes: a switching mode of at least one of the frequency domain resource, the sending antenna or the transmit beam in the at least one time domain resource unit.

In combination with the second aspect or any one of the above-mentioned possible implementations, in another possible implementation of the second aspect, the mode of utilizing the frequency domain resource, the antenna and/or the transmit beam indicates: whether at least one of the frequency domain resource, the sending antenna or the transmit beam is switched in the at least one time domain resource unit.

In combination with the second aspect or any above possible implementation thereof, in another possible implementation of the second aspect, the resource utilization scheme includes: performing resource hopping on frequency domain resources in the at least one time domain resource unit; or, switching a sending antenna in the at least one time domain resource unit; or, switching a transmit beam in the at least one time domain resource unit; or, adopting a same beam and a same frequency domain resource for transmission in the at least one time domain resource unit.

In combination with the second aspect or any one of the above-mentioned possible implementations, in another possible implementation of the second aspect, switching the sending antenna in the at least one time domain resource unit, includes: switching the sending antenna within a same antenna panel in the at least one time domain resource unit; or performing switching between different antenna panels in the at least one time domain resource unit.

In combination with the second aspect or any one of the above-mentioned possible implementations, in another possible implementation of the second aspect, determining, by the network device, the resource utilization scheme used by the terminal device to transmit the SRS in the at least one time domain resource unit, includes: determining, by the network device, the resource utilization scheme according to a parameter configuration of the SRS resource.

In combination with the second aspect or any one of the above-mentioned possible implementations, in another possible implementation of the second aspect, the parameter configuration of the SRS resource includes a configuration of the resource utilization scheme by the network device for transmitting the SRS on the at least one time domain resource unit; determining, by the network device, the resource utilization scheme according to the parameter configuration of the SRS resource, includes: determining, by the network device, the resource utilization scheme, according to the configuration of the resource utilization scheme by the network device for transmitting the SRS on the at least one time domain resource unit.

In combination with the second aspect or any one of the above-mentioned possible implementations, in another possible implementation of the second aspect, determining, by the network device, the resource utilization scheme according to the parameter configuration of the SRS resource, includes: determining, by the network device, the resource utilization scheme according to a configuration of at least one of the following: a transmission bandwidth of the SRS resource; a quantity of antenna ports for performing the SRS transmission on the SRS resource; a quantity of the at least one time domain resource unit occupied by the SRS resource; a persistent scheme of transmitting the SRS on the SRS resource; an SRS resource hopping configuration of the SRS resource; an interval of subcarriers occupied for transmitting the SRS on the SRS resource; an SRS type of the SRS resource.

In combination with the second aspect or any one of the above-mentioned possible implementations, in another possible implementation of the second aspect, the persistent scheme of transmitting the SRS on the SRS resource includes: a periodic transmission scheme, a semi-persistent transmission scheme or an aperiodic transmission scheme.

In combination with the second aspect or any one of the above-mentioned possible implementations, in another possible implementation of the second aspect, the SRS type of the SRS resource is: an SRS for Channel State Information (CSI) measurement; or an SRS for beam management.

In combination with the second aspect or any one of the above-mentioned possible implementations, in another possible implementation of the second aspect, in case that the quantity of antenna ports for performing the SRS transmission on the SRS resource is less than a first predetermined value, the determined resource utilization scheme is switching a sending antenna in the at least one time domain resource unit; or in case that the quantity of antenna ports for performing the SRS transmission on the SRS resource is greater than or equal to a second predetermined value, the determined resource utilization scheme is not switching a sending antenna in the at least one time domain resource unit.

In combination with the second aspect or any one of the above-mentioned possible implementations, in another possible implementation of the second aspect, in case that a value of the SRS resource hopping configuration of the SRS resource is a first value, the determined resource utilization scheme is performing resource hopping on frequency domain resources in the at least one time domain resource unit; or in case that a value of the SRS resource hopping configuration of the SRS resource is not the first value, the determined resource utilization scheme is: switching a sending antenna in the at least one time domain resource unit; or, switching a transmit beam in the at least one time domain resource unit; or, adopting a same beam and a same frequency domain resource for transmission in the at least one time domain resource unit.

In combination with the second aspect or any one of the above-mentioned possible implementations, in another possible implementation of the second aspect, after receiving, by the network device, the SRS transmitted by the terminal device on the at least one time domain resource unit, the method further includes: indicating, by the network device, a target time domain resource unit in the at least one time domain resource unit to the terminal device, according to a reception result of the SRS.

In combination with the second aspect or any one of the above-mentioned possible implementations, in another possible implementation of the second aspect, the time domain resource unit is a OFDM symbol, a time slot, a mini time slot or a subframe.

In a third aspect, a terminal device is provided, which is used for performing the method in the above first aspect or any possible implementation of the first aspect. The terminal device includes functional modules used for executing the method in the first aspect or any possible implementation of the first aspect described above.

In a fourth aspect, a network device is provided, which is used for performing the method in the above second aspect or any possible implementation of the second aspect. The network device includes functional modules for executing the method in the second aspect or in any possible implementation of the second aspect described above.

In a fifth aspect, a terminal device is provided, which includes a processor, a memory, and a transceiver. The processor, the memory, and the transceiver communicate with each other through internal connection paths to transfer control and/or data signals, so that the terminal device implements the method in the first aspect or any possible implementation of the first aspect described above.

In a sixth aspect, a network device is provided, which includes a processor, a memory, and a transceiver. The processor, the memory, and the transceiver communicate with each other through internal connection paths to transfer control and/or data signals, so that the network device implements the method in the second aspect or any possible implementation of the second aspect described above.

In a seventh aspect, a computer readable medium for storing a computer program is provided. The computer program includes instructions for executing any method or any possible implementation of the method described above.

In an eighth aspect, a computer program product containing instructions is provided. In case of running on a computer, the computer program product causes the computer to execute any method or the method in any possible implementation described above.

BRIEF DESCRIPTION OF DRAWINGS

To describe the technical solution of Implementations of the present disclosure more clearly, accompanying drawings that need to be used in the description of Implementations or the prior art will be briefly introduced below. It is apparent that the accompanying drawings described below are only some Implementations of the present disclosure; and for a person of ordinary skill in the art, other drawings may be obtained according to these drawings without paying an inventive effort.

DETAILED DESCRIPTION

The technical solution in Implementations of the present disclosure will be described below with reference to the drawings in Implementations of the present disclosure. It is apparent that the Implementations described are just some Implementations of the present disclosure, but not all Implementations of the present disclosure. According to the Implementations of the present disclosure, all other Implementations achieved by a person of ordinary skill in the art without paying an inventive effort are within the protection scope of the present disclosure.

Technical solutions of Implementations of the present disclosure may be applied to various communication systems, such as, a Global System of Mobile communication (GSM) system, a Code Division Multiple Access (CDMA) system, a Wideband Code Division Multiple Access (WCDMA) system, a General Packet wireless Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a future 5G system (may also be referred to as a New Radio (NR) system), or the like.

Figure 1:
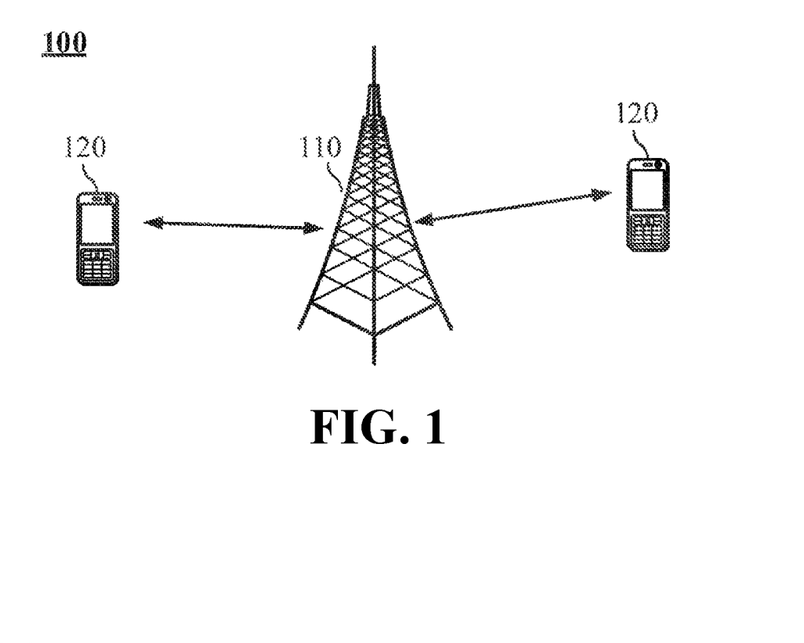
FIG. 1 is a schematic diagram of a wireless communication system according to an Implementation of the present disclosure.

FIG. 1 shows a wireless communication system 100 to which an Implementation of the present disclosure is applied. The wireless communication system 100 may include a network device 110. The network device 100 may be a device that communicates with a terminal device. The network device 100 may provide communication coverage for a specific geographical area, and may communicate with a terminal device (e.g., UE) in the coverage area. The network device 100 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or the network device may be a relay station, an access point, a vehicle-mounted device, a wearable device, a network side device in a future 5G network, or a network device in a future evolved Public Land Mobile Network (PLMN), etc.

The wireless communication system 100 further includes at least one terminal device 120 in the coverage area of the network device 110. The terminal device 120 may be mobile or fixed. The terminal device 120 may be referred to as an access terminal, a User device (UE), a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved Public Land Mobile Network (PLMN), or the like.

Device to Device (D2D) communication may be performed between the terminal devices 120.

The 5G system or network may also be referred to as a New Radio (NR) system or network.

FIG. 1 illustrates one network device and two terminal devices. The wireless communication system 100 may include multiple network devices, and another quantity of terminal devices may be included within the coverage area of each network device, which is not limited in Implementations of the present disclosure.

The wireless communication system 100 may further include other network entities such as a network controller, a mobile management entity, and Implementations of the present disclosure are not limited thereto.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

Figure 2:
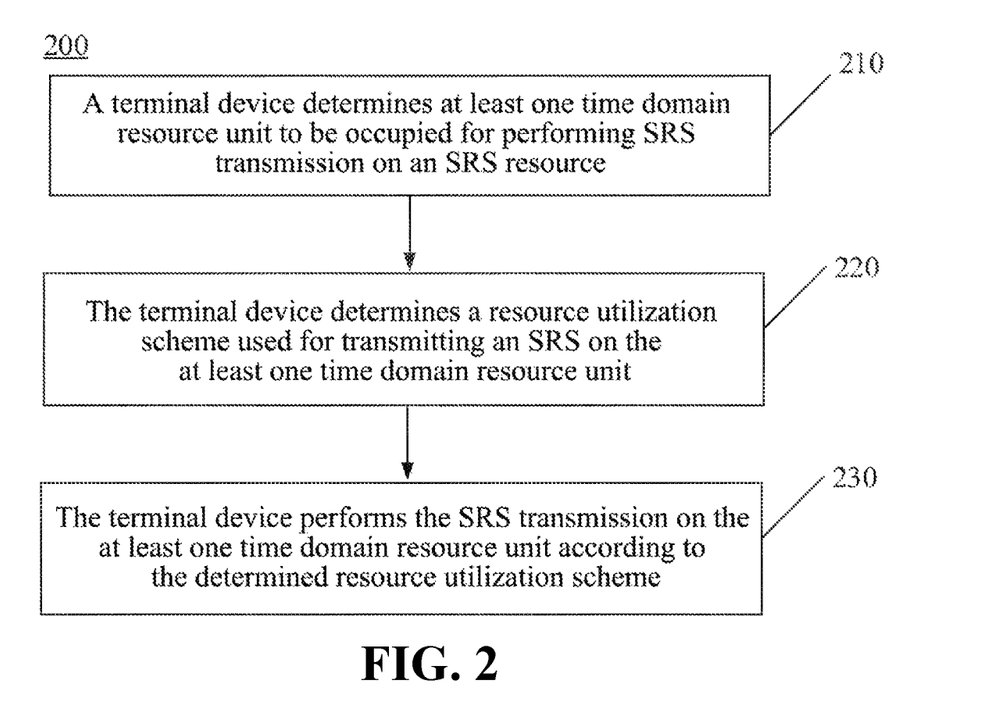
FIG. 2 is a schematic flowchart of a wireless communication method according to an Implementation of the present disclosure.

FIG. 2 is a schematic flowchart of a wireless communication method 200 according to an Implementation of the present disclosure. The method 200 may be applied to, but not limited to, the system shown in FIG. 1. The method 200 includes at least part of contents of the following.

In 210, a terminal device determines at least one time domain resource unit to be occupied for performing SRS transmission on an SRS resource.

In the Implementation of the present disclosure, the SRS resource is a resource which may be used to transmit the SRS. The at least one time domain resource unit for performing the SRS transmission may belong to one SRS resource. The one SRS resource is any one of multiple SRS resources which may be used for SRS transmission. In the multiple SRS resources, at least one parameter configuration of each SRS resource is independent of other SRS resources, and the at least one parameter configuration includes at least one of the following: a time domain resource occupied for sending an SRS; a frequency domain resource occupied for sending an SRS; an SRS sequence used for sending an SRS; a number of times that an SRS is sent after receiving trigger signaling sent by a network device; or the like. A network side may allocate a configuration parameter for each SRS resource with independent signaling The time domain resource unit mentioned in Implementations of the present disclosure may be an Orthogonal Frequency Division Multiplexing (OFDM) symbol, a time slot, a mini time slot or a subframe.

In case that the time domain resource unit is a OFDM symbol, the length of the OFDM symbol may be determined according to a subcarrier interval used to transmit an SRS on the SRS resource, or may be determined according to a subcarrier interval for determining a time slot length of a time slot in which the OFDM symbol is located, or may be determined according to a subcarrier interval used to transmit data in a time slot in which the OFDM symbol is located.

In case that multiple time domain resource units are determined by the terminal device, the multiple time domain resource units are continuous time domain resource units.

In case that the time domain resource unit is an OFDM symbol, the at least one time domain resource unit determined by the terminal device may be the last at least one OFDM symbol of a time slot.

The terminal device may determine the at least one time domain resource unit according to a configuration of the network device.

For example, the network device may configure the last few OFDM symbols in a time slot for SRS transmission, then the terminal device may determine the last few OFDM symbols to transmit an SRS according to the configuration of the network device.

The terminal device may determine the at least one time domain resource unit according to a current communication requirement.

For example, in case that an SRS is sent currently for transmit beam management, a same quantity of time domain resource units as a quantity of transmit beams may be selected.

For example, in case that an SRS is sent currently for obtaining uplink channel information of multiple antennas, a same quantity of time domain resource units as a quantity of sending antennas may be selected.

In 220, the terminal device determines a resource utilization scheme used for transmitting an SRS on the at least one time domain resource unit.

The resource utilization scheme used for transmitting the SRS may be a resource utilization scheme for a non-time domain resource, for example, the resource utilization scheme may be a mode of utilizing a frequency domain resource, a transmit antenna and/or a transmit beam by the terminal device in case of performing the SRS transmission on the at least one time domain resource unit.

It should be understood that the resource utilization scheme may also be a mode of utilizing a resource other than a frequency domain resource, a sending antenna and a transmit beam, for example, may be a mode of utilizing a code domain resource, and Implementations of the present disclosure do not particularly restrict this.

The mode of utilizing the frequency domain resource, the antenna and/or the transmit beam includes: a switching mode of at least one of the frequency domain resource, the sending antenna or the transmit beam in the at least one time domain resource unit.

The switching mode may indicate an object which is required to be switched in at least one of the frequency domain resource, the sending antenna or the transmit beam, and/or how the object to be switched is switched in the at least one time domain resource unit.

In case that one time domain resource unit is determined, the switching mode may indicate an object which is required to be switched in at least one of the frequency domain resource, the sending antenna or the transmit beam, and/or how the object to be switched is switched among multiple finer-grained resources in the one time domain resource unit.

For example, the time domain resource unit is a subframe, and the switching mode may indicate a mode of how at least one of the frequency domain resource, the sending antenna, or the transmit beam is switched among multiple time slots in the subframe.

Or, in case that multiple time domain resource units are determined, the switching mode may indicate an object which is required to be switched in at least one of the frequency domain resource, the sending antenna or the transmit beam, and/or a mode how the object to be switched is switched among the multiple time domain resource units, and/or a mode how the object to be switched is switched among multiple finer-grained resources within a certain time domain resource unit.

For example, the multiple time domain resource units are multiple subframes, and the switching mode may indicate a mode in which the frequency domain resource, the sending antenna and/or the transmit beam is switched among multiple time slots within a certain subframe, or indicate a mode in which the frequency domain resource, the sending antenna and/or the transmit beam is switched among the multiple subframes.

At least one of the frequency domain resource, the sending antenna or the transmit beam is switched in the at least one time domain resource unit means that at least one of the frequency domain resource, the sending antenna or the transmit beam is not always the same in the at least one time domain resource unit.

In case that the time domain resource unit determined by the terminal device includes one time domain resource unit, at least one of the frequency domain resource, the sending antenna or the transmit beam is different in at least part of the time domain resources in multiple more fine-grained time domain resources in the time domain resource unit.

For example, if the one time domain resource unit is a subframe, then at least one of the frequency domain resource, the sending antenna, or the transmit beam is different in at least part of the time domain resources in multiple time slots within the subframe.

Or, in case that the time domain resource unit determined by the terminal device includes multiple time domain resource units, at least one of the frequency domain resource, the sending antenna or the transmit beam is not always the same among multiple finer-grained time domain resources of a certain time domain resource unit (i.e., different in at least part of the time domain resources in the multiple time domain resources), or at least one of the frequency domain resource, the sending antenna or the transmit beam is not always the same among the multiple time domain resource units (i.e., different in at least part of the time domain resource units in the multiple time domain resource units).

For example, the multiple time domain resource units are multiple subframes, then at least one of the frequency domain resource, the sending antenna or the transmit beam is not always the same among the multiple subframes, or at least one of the frequency domain resource, the sending antenna or the transmit beam is not always the same among multiple time slots of a certain subframe in the multiple subframes.

The mode of utilizing the frequency domain resource, the antenna, and/or the transmit beam indicates: whether at least one of the frequency domain resource, the sending antenna or the transmit beam is switched in the at least one time domain resource unit.

For example, the mode indicates whether the frequency domain resource, the sending antenna and the transmit beam are switched in the at least one time domain resource unit respectively.

In Implementations of the present disclosure, the resource utilization scheme determined by the terminal device includes mode 1), mode 2), mode 3) or mode 4).

Among them, the mode 1) is performing resource hopping on frequency domain resources in the at least one time domain resource unit.

For example, the terminal device may adopt different frequency domain resources to transmit the SRS on different time domain resource units, wherein an agreed frequency domain resource hopping pattern is adopted among frequency domain resources used to transmit the SRS on the different time domain resource units, for example, the resource hopping pattern is determined according to the quantity of time domain resource units and/or a configuration of the network side.

The mode 2) is switching a sending antenna in the at least one time domain resource unit.

Switching the sending antenna in the at least one time domain resource unit in the mode 2) includes mode 2-1) and mode 2-2).

The mode 2-1) is switching the sending antenna within a same antenna panel in the at least one time domain resource unit; or, for example, the terminal device adopts different physical antennas in a same antenna array to transmit the SRS in different time domain resource units, and indexes of the physical antennas used to transmit the SRS on the different time domain resource units may be obtained according to an agreed formula, generally adopting a mode of antenna polling. For example, the physical antenna currently used for transmitting the SRS is determined according to an index of the time domain resource unit. In an implementation, due to the limitation of radio frequencies of a terminal, a quantity of uplink radio frequencies may be less than a quantity of physical antennas. To enable the network device to obtain a corresponding channel of each physical antenna, the terminal device may send the SRS on each physical antenna in turn.

Mode 2-2) is performing switching between different antenna panels in the at least one time domain resource unit.

For example, the terminal device adopts different antenna panels to transmit the SRS in different time domain resource units, and the antenna panels for transmitting the SRS on the different time domain resource units may be determined by the terminal device itself or configured by the network side. After receiving an SRS sent on multiple time domain resource units, the network device may notify the terminal device of an index of the time domain resource unit in which an SRS signal with the best received quality is located, so that the terminal device may subsequently transmit another signal by adopting a corresponding antenna panel. In a specific implementation, that the terminal device adopts different antenna panels to send SRS signals, may be reflected in an assumption of the terminal device that at least spatial parameters of the SRSs transmitted on different time domain resource units are not quasi-co-located.

It should be understood that, in addition to the modes 2-1) and 2-2), the mode 2) may also include another mode. For example, an antenna array which sends the SRS on the at least one time domain resource unit may include multiple antenna arrays, at least one antenna array among the multiple antenna arrays includes multiple antennas for transmitting the SRS on the at least one time domain resource unit, wherein in case that the SRS is sent, each antenna occupies a different time domain resource compared with other antennas.

The mode 3) is switching a transmit beam in the at least one time domain resource unit.

For example, the terminal device adopts different beams to transmit the SRS in different time domain resource units, and the beams for transmitting the SRS on different time domain resource units may be determined by the terminal device itself or configured by the network side. After receiving the SRS transmitted by different beams on multiple time domain resource units, the network side may inform the terminal device of an index of the time domain resource unit in which an SRS signal with the best receiving quality is located, so that the terminal device may subsequently transmit another signal by adopting a corresponding beam. In a specific implementation, that the terminal device adopts different beams to send SRS signals may be reflected in an assumption of the terminal device or a network that spatial parameters of the SRSs transmitted on different time domain resource units are not Quasi-co-location (QCL).

The mode 4) is adopting a same beam and a same frequency domain resource for transmission in the at least one time domain resource unit.

For example, the terminal device adopts the same beam and frequency domain resource to transmit the SRS in the multiple time domain resource units, and the network device may adopt different receiving beams to receive the SRS in the multiple time domain resource units, thereby determining the best receiving beam. In a specific implementation, that the terminal adopts a same beam to send SRS signals may be reflected in an assumption of the terminal or a base station that spatial parameters of the SRSs transmitted on different time domain resource units are quasi-co-located.

In Implementations of the present disclosure, the terminal device may select a resource utilization scheme to use from multiple resource utilization schemes. For example, one mode is selected from the mode 1), the mode 2-1), the mode 2-2), the mode 3) and the mode 4).

In Implementations of the present disclosure, the terminal device may determine the resource utilization scheme according to a parameter configuration of the SRS resource.

In an implementation, the parameter configuration of the SRS resource includes a configuration of the resource utilization scheme by the network device for transmitting the SRS on the at least one time domain resource unit; the terminal device determines the resource utilization scheme according to the configuration of the resource utilization scheme by the network device for transmitting the SRS on the at least one time domain resource unit.

Configuration information of the resource utilization scheme may be indicated to the terminal device together with another parameter configuration of the SRS resource, for example, through high-layer signaling. In addition, if the SRS resource is used for aperiodic SRS transmission, then the configuration information of the resource utilization scheme may be indicated to the terminal device through Downlink Control Information (DCI) together with trigger signaling of an aperiodic SRS.

In an implementation, the terminal device determines the resource utilization scheme according to a configuration of at least one of the following: a transmission bandwidth of the SRS resource; a quantity of antenna ports for performing the SRS transmission on the SRS resource; a quantity of at least one time domain resource unit occupied by the SRS resource; a persistent scheme of transmitting the SRS on the SRS resource; an SRS resource hopping configuration of the SRS resource; an interval of subcarriers occupied for transmitting the SRS on the SRS resource; an SRS type of the SRS resource.

The persistent scheme of transmitting the SRS on the SRS resource includes a periodic transmission scheme, a semi-persistent transmission scheme or an aperiodic transmission scheme.

Semi-persistent transmission is SRS transmission activated by activation signaling and may be stopped by deactivation signaling, and aperiodic transmission is a limited number of times of SRS transmission triggered by DCI, not requiring to be stopped by deactivation signaling.

The SRS type of the SRS resource is: an SRS for Channel State Information (CSI) measurement; or an SRS for beam management.

The SRS type may be distinguished according to a purpose of a sent SRS. For example, two SRS types may be defined, which are respectively used for uplink CSI measurement and uplink sending/receiving beam management.

It should be understood that in addition to distinguishing SRS types according to purposes of SRSs, the SRS types may also be distinguished according to other factors, which is not specifically limited in Implementations of the present disclosure.

In order to understand the present disclosure more clearly, several specific implementations of determining the resource utilization scheme will be introduced below. It should be understood that the following is only specific implementations of the present disclosure and should not constitute special restrictions on the present disclosure.

In an implementation, in case that the quantity of antenna ports for performing the SRS transmission on the SRS resource is less than a first predetermined value, the determined resource utilization scheme is switching a sending antenna in the at least one time domain resource unit; or, in case that the quantity of antenna ports for performing the SRS transmission on the SRS resource is greater than or equal to a second predetermined value, the determined resource utilization scheme is not switching a sending antenna in the at least one time domain resource unit.

In an implementation, in case that a value of the SRS resource hopping configuration of the SRS resource is a first value, the determined resource utilization scheme is performing resource hopping on frequency domain resources in the at least one time domain resource unit; or, in case that a value of the SRS resource hopping configuration of the SRS resource is not a first value, the determined resource utilization scheme is: switching a sending antenna in the at least one time domain resource unit; or, switching a transmit beam in the at least one time domain resource unit; or, adopting a same beam and a same frequency domain resource for transmission in the at least one time domain resource unit. The first value is optionally 1 or 0.

In an implementation, the terminal device determines the resource utilization scheme according to the transmission bandwidth of the SRS resource.

For example, if the transmission bandwidth of the SRS resource is greater than or equal to a definite value of a user (e.g., an entire transmission bandwidth of the user), then the determined resource utilization scheme indicates that the resource hopping on frequency domain resources is not performed in the at least one time domain resource unit; and if the transmission bandwidth of the SRS resource is less than a definite value, then the determined resource utilization scheme indicates that the resource hopping on frequency domain resources is performed in the at least one time domain resource unit.

In an implementation, the terminal determines the resource utilization scheme according to the persistent scheme of the SRS on the SRS resource.

For example, in case that the terminal device performs periodic transmission or semi-persistent transmission of the SRS, then it determine to switch a transmit beam in the at least one time domain resource unit, to adopt a same beam and a same frequency domain resource for transmission in the at least one time domain resource unit, or to switch between different antenna panels in the at least one time domain resource unit; and in case that the terminal device performs aperiodic SRS transmission, it determine to perform resource hopping on frequency domain resources in the at least one time domain resource unit.

In an implementation, the terminal device may determine the resource utilization scheme according to a subcarrier interval used for transmitting the SRS on the SRS resource.

For example, if the subcarrier interval is equal to a subcarrier interval for determining a time slot length of a time slot in which the time domain resource unit is located, or is equal to a subcarrier interval for transmitting data in a time slot in which the time domain resource unit is located, then resource hopping on frequency domain resources may be performed in the at least one time domain resource unit, or switching a sending antenna within a same antenna panel may be performed in the at least one time domain resource unit.

For example, if the subcarrier interval is greater than a subcarrier interval for determining a time slot length of a time slot in which the time domain resource unit is located, or is greater than a subcarrier interval for transmitting data in a time slot in which the time domain resource unit is located, then switching between different antenna panels may be performed in the at least one time domain resource unit, switching a transmit beam may be performed in the at least one time domain resource unit, or transmission may be performed by adopting a same beam and a same frequency domain resource in the at least one time domain resource unit.

In an implementation, in case that the terminal determines the transmission scheme according to the SRS type of the SRS resource, if the SRS type is the SRS for obtaining CSI, then the resource hopping on frequency domain resources may be performed in the at least one time domain resource unit, or switching the sending antenna within the same antenna panel may be performed in the at least one time domain resource unit; and if the SRS type is the SRS for beam management, then switching between different antenna panels may be performed in the at least one time domain resource unit, switching the transmit beam may be performed in the at least one time domain resource unit, or transmission may be performed by adopting the same beam and the same frequency domain resource in the at least one time domain resource unit.

In 230, the terminal device performs the SRS transmission in the at least one time domain resource unit according to the determined resource utilization scheme.

In the Implementation of the present disclosure, after the terminal device performs the SRS transmission on the at least one time domain resource unit, the terminal device receives a target time domain resource unit in the at least one time domain resource unit indicated by the network device.

The network device may select the target time domain resource unit (e.g., the time domain resource unit bearing an SRS with the best signal quality) from the at least one time domain resource unit according to a reception result of the SRS, and indicate the target time domain resource unit to the terminal device. The terminal device may send a subsequent uplink signal according to the indication of the network device. The terminal device may send a subsequent uplink signal according to a sending mode of sending an SRS on the target time domain resource unit.

For example, the terminal device may send the subsequent uplink signal to the network device by utilizing a transmit beam, a sending power, or a sending antenna, etc., adopted in case of sending the SRS on the target time domain resource unit.

Therefore, in Implementations of the present disclosure, a terminal device determines at least one time domain resource unit occupied for performing SRS transmission on an SRS resource; the terminal device determines a resource utilization scheme used for transmitting an SRS on the at least one time domain resource unit; and the terminal device performs the SRS transmission on the at least one time domain resource unit according to the determined resource utilization scheme, so that the terminal device may flexibly select the resource utilization scheme used for transmitting the SRS on the time domain resource unit, and thus a function of the time domain resource unit can be realized as required.

Figure 3:
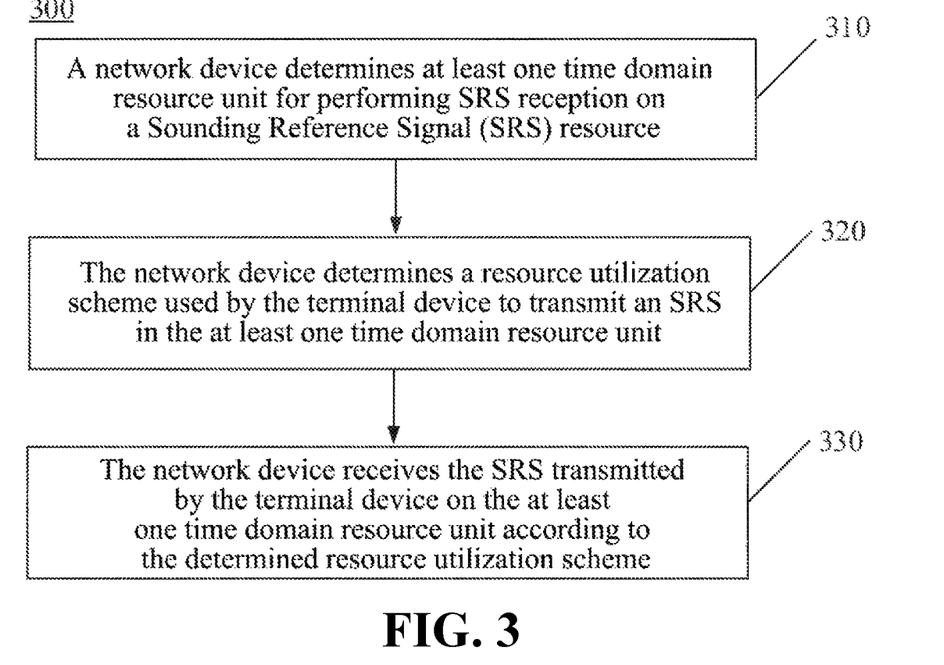
FIG. 3 is a schematic flowchart of a wireless communication method according to an Implementation of the present disclosure.

FIG. 3 is a schematic flowchart of a wireless communication method 300 according to an Implementation of the present disclosure. The method 300 includes at least some of the following contents.

In 310, a network device determines at least one time domain resource unit for performing SRS reception on a Sounding Reference Signal (SRS) resource.

The time domain resource unit is an OFDM symbol, a time slot, a mini time slot or a subframe.

In 320, the network device determines a resource utilization scheme used by the terminal device to transmit an SRS in the at least one time domain resource unit.

The resource utilization scheme is a scheme by which the terminal device utilizes a frequency domain resource, a transmit antenna and/or a transmit beam in case of performing SRS transmission on the at least one time domain resource unit.

The mode of utilizing the frequency domain resource, the antenna and/or the transmit beam includes a switching mode of at least one of the frequency domain resource, the sending antenna and the transmit beam in the at least one time domain resource unit.

The mode of utilizing the frequency domain resource, the antenna and/or the transmit beam indicates whether at least one of the frequency domain resource, the sending antenna or the transmit beam is switched on the at least one time domain resource unit.

The resource utilization scheme includes: performing resource hopping on frequency domain resources in the at least one time domain resource unit; or, switching a sending antenna in the at least one time domain resource unit; or, switching a transmit beam in the at least one time domain resource unit; or, adopting a same beam and a same frequency domain resource for transmission in the at least one time domain resource unit.

Switching the sending antenna in the at least one time domain resource unit includes: switching the sending antenna within a same antenna panel in the at least one time domain resource unit; or performing switching between different antenna panels in the at least one time domain resource unit.

The network device determines the resource utilization scheme according to a parameter configuration of the SRS resource.

In an implementation, the parameter configuration of the SRS resource includes a configuration of the resource utilization scheme by the network device for transmitting the SRS on the at least one time domain resource unit; and the network device determines the resource utilization scheme according to the configuration of the resource utilization scheme by the network device for transmitting the SRS on the at least one time domain resource unit.

In an implementation, the network device determines the resource utilization scheme according to a configuration of at least one of the following: a transmission bandwidth of the SRS resource; a quantity of antenna ports for performing the SRS transmission on the SRS resource; a quantity of the at least one time domain resource unit occupied by the SRS resource; a persistent scheme of transmitting the SRS on the SRS resource; an SRS resource hopping configuration of the SRS resource; an interval of subcarriers occupied for transmitting the SRS on the SRS resource; an SRS type of the SRS resource.

The persistent scheme of transmitting the SRS on the SRS resource includes a periodic transmission scheme, a semi-persistent transmission scheme or an aperiodic transmission scheme.

The SRS type of the SRS resource is: an SRS for Channel State Information (CSI) measurement; or an SRS for beam management.

In case that the quantity of antenna ports for performing the SRS transmission on the SRS resource is less than a first predetermined value, the determined resource utilization scheme is switching a sending antenna in the at least one time domain resource unit; or in case that the quantity of antenna ports for performing the SRS transmission on the SRS resource is greater than or equal to a second predetermined value, the determined resource utilization scheme is not switching a sending antenna in the at least one time domain resource unit.

In case that a value of the SRS resource hopping configuration of the SRS resource is a first value, the determined resource utilization scheme is performing resource hopping on frequency domain resources in the at least one time domain resource unit; or in case that a value of the SRS resource hopping configuration of the SRS resource is not a first value, the determined resource utilization scheme is: switching a sending antenna in the at least one time domain resource unit; or, switching a transmit beam in the at least one time domain resource unit; or, adopting a same beam and a same frequency domain resource for transmission in the at least one time domain resource unit.

In 330, the network device receives the SRS transmitted by the terminal device on the at least one time domain resource unit according to the determined resource utilization scheme.

In the Implementation of the present disclosure, after the network device receives the SRS transmitted by the terminal device on the at least one time domain resource unit, the network device indicates a target time domain resource unit in the at least one time domain resource unit to the terminal device according to a reception result of the SRS.

It should be understood that the specific implementation in the method 300 shown in FIG. 3 may refer to the implementation in the method 200. For example, the implementation of determining, by the network device, the resource utilization scheme may refer to the implementation of determining, by the terminal device, the resource utilization scheme, which will not be repeated here for brevity.

Figure 4:
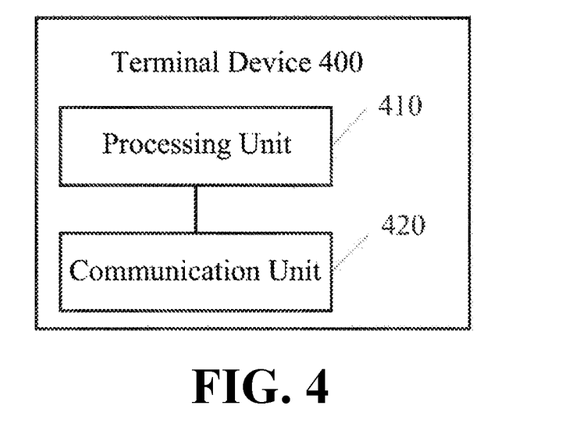
FIG. 4 is a schematic block diagram of a terminal device according to an Implementation of the present disclosure.

FIG. 4 is a schematic block diagram of a terminal device 400 according to an Implementation of the present disclosure. As shown in FIG. 4, the terminal device 400 may include a processing unit 410 and a communication unit 420.

The processing unit 410 is used for determining at least one time domain resource unit occupied for performing SRS transmission on a Sounding Reference Signal (SRS) resource; determining a resource utilization scheme used for transmitting an SRS on the at least one time domain resource unit; the communication unit 420 is used for performing the SRS transmission on the at least one time domain resource unit according to the resource utilization scheme determined by the processing unit.

It should be understood that the terminal device 400 may correspond to the terminal device in the method 200, and may implement a corresponding operation implemented by the terminal device in the method 200, which will not be described in detail herein for the sake of brevity.

Figure 5:
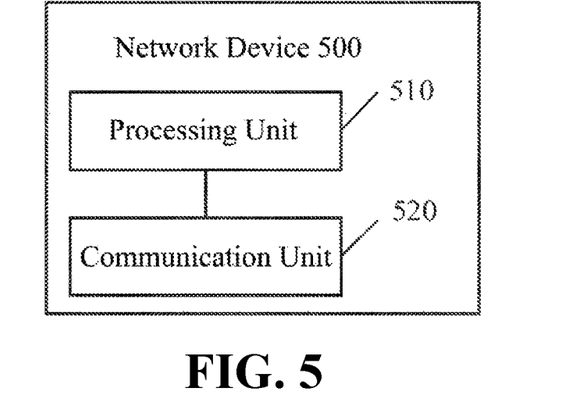
FIG. 5 is a schematic block diagram of a network device according to an Implementation of the present disclosure.

FIG. 5 is a schematic block diagram of a network device 500 according to an Implementation of the present disclosure. As shown in FIG. 5, the network device 500 may include a processing unit 510 and a communication unit 520.

The processing unit 510 is used for determining at least one time domain resource unit for performing SRS reception on a Sounding Reference Signal (SRS) resource; determining a resource utilization scheme used by the terminal device to transmit an SRS in the at least one time domain resource unit; the communication unit 520 is used for receiving the SRS transmitted by the terminal device on the at least one time domain resource unit according to the resource utilization scheme determined by the processing unit 510.

It should be understood that the network device 500 may correspond to the network device in the method 300, and may implement a corresponding operation implemented by the network device in the method 300, which will not be described in detail herein for the sake of brevity.

Figure 6:
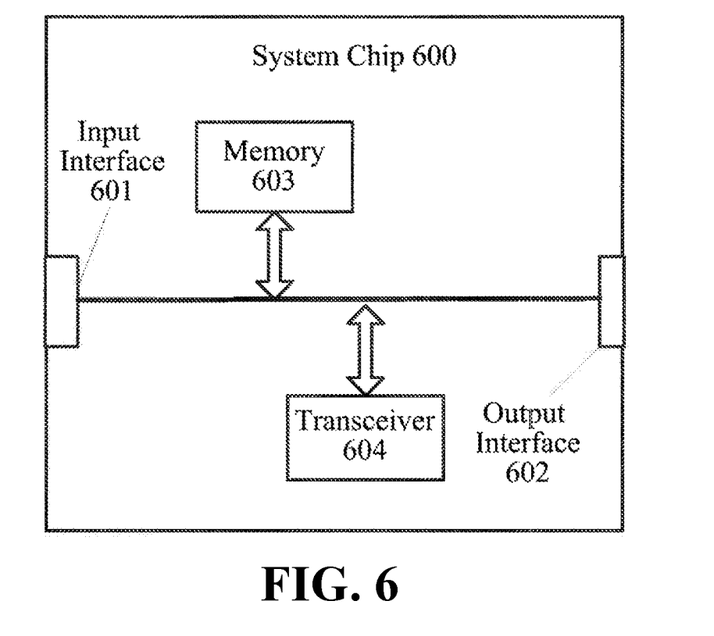
FIG. 6 is a schematic block diagram of a system chip according to an Implementation of the present disclosure.

FIG. 6 is a schematic structural diagram of a system chip 600 according to an Implementation of the present disclosure. The system chip 600 of FIG. 6 includes an input interface 601, an output interface 602, a processor 603, and a memory 604, which could be connected through internal communication connection lines. The processor 603 is used for executing codes in the memory 604.

In case that the codes are executed, the processor 603 implements the method implemented by the network device in the method Implementations. For sake of conciseness, the specific description will not be repeated here.

In case that the codes are executed, the processor 603 implements the method implemented by the terminal device in the method Implementations. For sake of conciseness, the specific description will not be repeated here.

Figure 7:
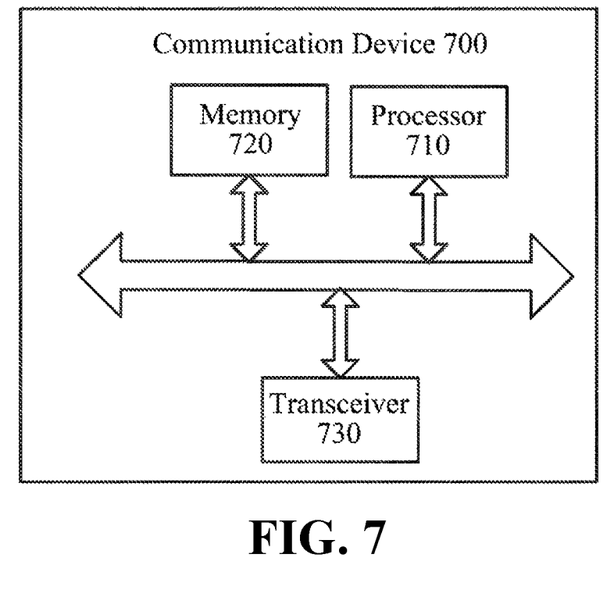
FIG. 7 is a schematic block diagram of a communication device according to an Implementation of the present disclosure.

FIG. 7 is a schematic block diagram of a communication device 700 according to an Implementation of the present disclosure. As shown in FIG. 7, the communication device 700 includes a processor 710 and a memory 720. The memory 720 may store program codes, and the processor 710 may execute the program codes stored in the memory 720.

As shown in FIG. 7, the communication device 700 may include a transceiver 730, and the processor 710 may control the transceiver 730 to communicate with the external.

The processor 710 may call the program codes stored in the memory 720 to perform corresponding operations of the network device in the method Implementations, which will not be described here repeatedly for brevity.

The processor 710 may call the program codes stored in the memory 720 to perform corresponding operations of the terminal device in the method Implementations, which will not be described here repeatedly for brevity.

It should be understood that the processor in an Implementation of the present invention may be an integrated circuit chip with a capability for processing signals. In the implementation process, the actions of the method Implementations described above may be accomplished by integrated logic circuits of hardware in the processor or instructions in the form of software. The processor may be a general purpose processor, a digital signal processor (DSP), an application specific integrated circuit (ASIC), a field programmable gate array (FPGA), or other programmable logic device, discrete gate or transistor logic device, or discrete hardware component. The processor may implement various methods, acts and logic block diagrams disclosed in Implementations of the present disclosure. The general purpose processor may be a microprocessor or the processor may be any conventional processor or the like. The actions of the method disclosed in connection with the Implementation of the present disclosure may be directly embodied by the execution of the hardware decoding processor, or by the execution of a combination of hardware and software modules in the decoding processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and accomplishes the actions of the above method in combination with its hardware.

It should be understood that the memory in Implementations of the present disclosure may be a transitory memory or non-transitory memory, or may include both transitory and non-transitory memories. The non-transitory memory may be a read-only memory (ROM), programmable ROM (PROM), an erasable programmable ROM (EPROM), an electrically erasable programmable ROM (EEPROM), or a flash memory. The transitory memory may be a random access memory (RAM) which serves as an external cache. As an example but not a limitation, many forms of RAMs are available, such as a static random access memory (SRAM), a dynamic random access memory (DRAM), a synchronous dynamic random access memory (SDRAM), a double data rate SDRAM (DDR SDRAM), an enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

Those of ordinary skill in the art will recognize that the example units and algorithm acts described in connection with the Implementations disclosed herein may be implemented in electronic hardware, or a combination of computer software and electronic hardware. Whether these functions are implemented in hardware or software depends on a specific application and design constraint of the technical solution. Skilled artisans may use different approaches to realize the described functions for each particular application, but such realization should not be considered to be beyond the scope of the present disclosure.

Those skilled in the art may clearly understand that for convenience and conciseness of description, the specific working process of the system, device and unit described above may refer to the corresponding process in the Implementations of methods described above, and details are not described herein again.

In several Implementations provided by the present disclosure, it should be understood that the disclosed system, apparatus and method may be implemented in other ways. For example, the apparatus Implementations described above are only illustrative, for another example, the division of the units is only a logical function division, and there may be other division manners in actual implementation. For still another example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The units described as separated components may or may not be physically separated, and the component shown as a unit may or may not be a physical unit, i.e., it may be located in one place or may be distributed over multiple network units. Some or all of the units may be selected according to practical needs to achieve a purpose of the solution of the Implementations.

In addition, various functional units in various implementations of the present disclosure may be integrated in one processing unit, or various units may be physically present separately, or two or more units may be integrated in one unit.

The functions may be stored in a computer readable storage medium if implemented in a form of a software functional unit and sold or used as a separate product. Based on this understanding, the technical solution of the present disclosure, in essence, or the part contributing to the existing art, or the part of the technical solution, may be embodied in the form of a software product stored in a storage medium, including a number of instructions for causing a computer device (which may be a personal computer, a server, or a network device, etc.) to perform all or part of the acts of the methods described in various Implementations of the present disclosure. The aforementioned storage medium includes various media capable of storing program codes, such as a U disk, a mobile hard disk, a read-only memory (ROM), a random access memory (RAM), a magnetic disk, or an optical disk.

The foregoing are merely example implementations of the present disclosure, but the protection scope of the present disclosure is not limited thereto. Any person skilled in the art may easily conceive variations or substitutions within the technical scope disclosed by the present disclosure, which

What we claim is:

1. A method for wireless communication, comprising:
   determining, by a terminal device, multiple time domain resource units occupied for performing Sounding Reference Signal (SRS) transmission on an SRS resource;
   determining, by the terminal device, a resource utilization scheme used for transmitting an SRS on the multiple time domain resource units; and
   performing, by the terminal device, the SRS transmission on the multiple time domain resource units according to the determined resource utilization scheme;
   wherein the multiple time domain resource units are Orthogonal Frequency Division Multiplexing (OFDM) symbols; and
   wherein the resource utilization scheme indicates whether frequency domain resource is switched on the multiple OFDM symbols, the resource utilization scheme comprising:
      when the frequency domain resource is switched on the multiple OFDM symbols, performing resource hopping on frequency domain resources in the multiple OFDM symbols; and
      when the frequency domain resource is not switched on the multiple OFDM symbols, performing transmission with adopting a same beam and a same frequency domain resource in the multiple OFDM symbols;
   wherein the multiple OFDM symbols are last N continuous OFDM symbols of a time slot, and a length of an OFDM symbol is determined according to a subcarrier spacing used to transmit the SRS on the SRS resource.

2. The method according to claim 1, wherein the resource utilization scheme is a scheme by which the terminal device utilizes at least one of the frequency domain resource, a transmit antenna, or a transmit beam in case of performing the SRS transmission on the multiple time domain resource units.

3. The method according to claim 2, wherein a mode of utilizing at least one of the frequency domain resource, the transmit antenna, or the transmit beam comprises:
   a switching mode of at least one of the frequency domain resource, the transmit antenna or the transmit beam in the multiple time domain resource units.

4. The method according to claim 2, wherein a mode of utilizing at least one of the frequency domain resource, the transmit antenna, or the transmit beam indicates:
   whether the transmit antenna or the transmit beam is switched on the multiple time domain resource units.

5. The method according to claim 1, wherein determining, by the terminal device, the resource utilization scheme used for transmitting the SRS in the multiple time domain resource units, comprises:
   determining, by the terminal device, the resource utilization scheme according to a parameter configuration of the SRS resource.

6. The method according to claim 5, wherein determining, by the terminal device, the resource utilization scheme according to the parameter configuration of the SRS resource, comprises:
   determining, by the terminal device, the resource utilization scheme according to a configuration of at least one of the following:
      a transmission bandwidth of the SRS resource;
      a quantity of antenna ports for performing the SRS transmission on the SRS resource;
      a quantity of the multiple time domain resource units occupied by the SRS resource;
      a persistent scheme of transmitting the SRS on the SRS resource;
      an SRS resource hopping configuration of the SRS resource;
      an interval of subcarriers occupied for transmitting the SRS on the SRS resource; or
      an SRS type of the SRS resource.

7. The method according to claim 6, wherein in case that a value of the SRS resource hopping configuration of the SRS resource is a first value, the determined resource utilization scheme is performing resource hopping on frequency domain resources in the multiple time domain resource units; or
   in case that a value of the SRS resource hopping configuration of the SRS resource is not the first value, the determined resource utilization scheme is:
      switching a transmit antenna in the multiple time domain resource units; or,
      switching a transmit beam in the multiple time domain resource units; or,
      performing transmission with adopting a same beam and a same frequency domain resource in the multiple time domain resource units.

8. The method according to claim 1, wherein in case that the SRS is sent for transmit beam management, a same quantity of the OFDM symbols as a quantity of transmit beams are selected.

9. The method according to claim 1, wherein in case that the SRS is sent for obtaining uplink channel information of multiple antennas, a same quantity of the OFDM symbols as a quantity of sending antennas are selected.

10. A terminal device, comprising a processor, a memory, and a transceiver, wherein the memory is configured to store a computer program, the transceiver is configured to communicate with another device under control of the processor, and the processor, when executing the computer program, is configured to control the terminal device to:
   determine multiple time domain resource units occupied for performing Sounding Reference Signal (SRS) transmission on an SRS resource;
   determine a resource utilization scheme used for transmitting an SRS on the multiple time domain resource units; and
   perform the SRS transmission on the multiple time domain resource units according to the determined resource utilization scheme;
   wherein the multiple time domain resource units are Orthogonal Frequency Division Multiplexing (OFDM) symbols; and
   wherein the resource utilization scheme indicates whether frequency domain resource is switched on the multiple OFDM symbols, the resource utilization scheme comprising:
      when the frequency domain resource is switched on the multiple OFDM symbols, performing resource hopping on frequency domain resources in the multiple OFDM symbols; and
      when the frequency domain resource is not switched on the multiple OFDM symbols, performing transmission with adopting a same beam and a same frequency domain resource in the multiple OFDM symbols;

wherein the multiple OFDM symbols are last N continuous OFDM symbols of a time slot, and a length of an OFDM symbol is determined according to a subcarrier spacing used to transmit the SRS on the SRS resource.

11. The terminal device according to claim 10, wherein the resource utilization scheme is a scheme by which the terminal device utilizes at least one of the frequency domain resource, a transmit antenna or a transmit beam in case of performing the SRS transmission on the multiple time domain resource units.

12. The terminal device according to claim 11, wherein a mode of utilizing at least one of the frequency domain resource, the transmit antenna or the transmit beam comprises:
a switching mode of at least one of the frequency domain resource, the transmit antenna or the transmit beam in the multiple time domain resource units.

13. The terminal device according to claim 11, wherein a mode of utilizing at least one of the frequency domain resource, the transmit antenna or the transmit beam indicates:
whether the transmit antenna or the transmit beam is switched on the multiple time domain resource units.

14. The terminal device according to claim 10, wherein the processor is further configured to control the terminal device to:
determine the resource utilization scheme according to a parameter configuration of the SRS resource.

15. The terminal device according to claim 14, wherein the processor is further configured to control the terminal device to:
determine the resource utilization scheme according to a configuration of at least one of the following:
a transmission bandwidth of the SRS resource;
a quantity of antenna ports for performing the SRS transmission on the SRS resource;
a quantity of the multiple time domain resource units occupied by the SRS resource;
a persistent scheme of transmitting the SRS on the SRS resource;
an SRS resource hopping configuration of the SRS resource;
an interval of subcarriers occupied for transmitting the SRS on the SRS resource; or
an SRS type of the SRS resource.

16. The terminal device according to claim 15, wherein in case that a value of the SRS resource hopping configuration of the SRS resource is a first value, the determined resource utilization scheme is performing resource hopping on frequency domain resources in the multiple time domain resource units; or
in case that a value of the SRS resource hopping configuration of the SRS resource is not the first value, the determined resource utilization scheme is:
switching a transmit antenna in the multiple time domain resource units; or,
switching a transmit beam in the multiple time domain resource units; or,
performing transmission with adopting a same beam and a same frequency domain resource in the multiple time domain resource units.

17. The terminal device according to claim 10, wherein in case that the SRS is sent for transmit beam management, a same quantity of the OFDM symbols as a quantity of transmit beams are selected.

18. The terminal device according to claim 10, wherein in case that the SRS is sent for obtaining uplink channel information of multiple antennas, a same quantity of the OFDM symbols as a quantity of sending antennas are selected.

* * * * *